United States Patent

Moed

[19]

[11] Patent Number: 6,122,399
[45] Date of Patent: Sep. 19, 2000

[54] PATTERN RECOGNITION CONSTRAINT NETWORK

[75] Inventor: Michael C. Moed, Roswell, Ga.

[73] Assignee: NCR Corporation, Dayton, Ohio

[21] Appl. No.: 08/923,504

[22] Filed: Sep. 4, 1997

[51] Int. Cl.[7] .................................................. G06K 9/62
[52] U.S. Cl. ............................ 382/159; 706/20; 382/158
[58] Field of Search .................................... 382/156, 157, 382/159, 158, 225, 239; 706/20

[56] References Cited

U.S. PATENT DOCUMENTS

| 5,371,809 | 12/1994 | Desieno | 382/159 |
| 5,638,491 | 6/1997 | Moed | 706/20 |
| 5,812,700 | 9/1998 | Fang et al. | 382/239 |

OTHER PUBLICATIONS

Multiple sensor target classification using an unsupervised hybrid neural network, by Gelli et al. 0–7803–1901–X/94 IEEE, pp. 4028–4032, 1994.

Robotic Task Planning Using A Connectionist/Symbolic System, Moed et al., p. 296–316.

Primary Examiner—Joseph Mancuso
Assistant Examiner—Vikkram Bali
Attorney, Agent, or Firm—Needle & Rosenberg

[57] ABSTRACT

The present invention provides a novel pattern recognition system that may be used to determine the likelihood that an unknown item belongs to a predefined class. The present invention provides improved functionality over prior art systems in that both feature parameters and confidence parameters are trained automatically from ground truth image data; large numbers of different attributes can be analyzed in the model, which yields more accurate modeling; relationships between different features can also be trained from ground truth data and represented in parametric form; there is insensitivity to feature noise; parameters are based exclusively on statistical information; the need for heuristic information is minimized; retraining is straightforward and fast; on-line updating of model parameters is possible; and the models created are accurate and reliable at predicting the match of an unknown item to the model.

8 Claims, 17 Drawing Sheets

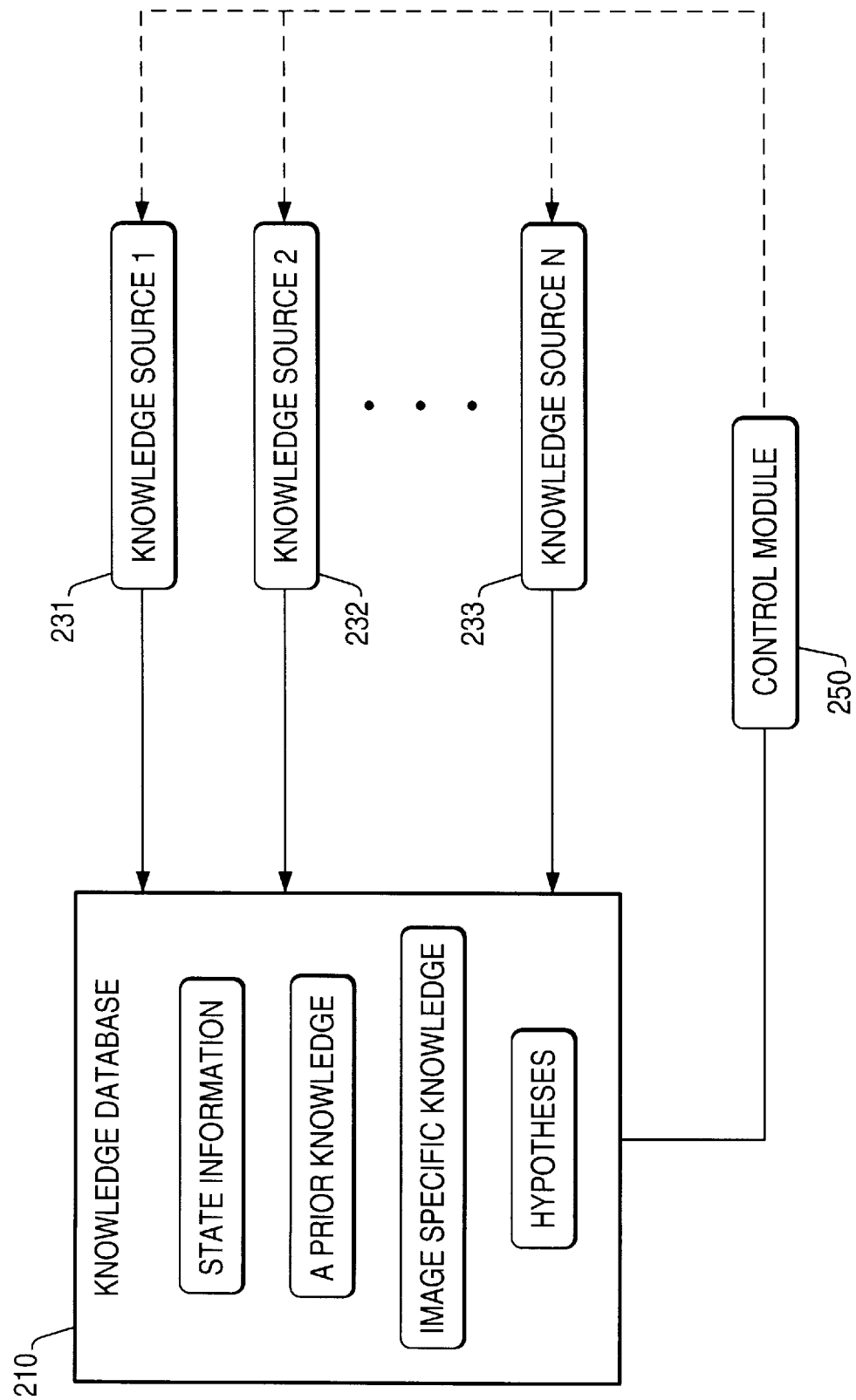

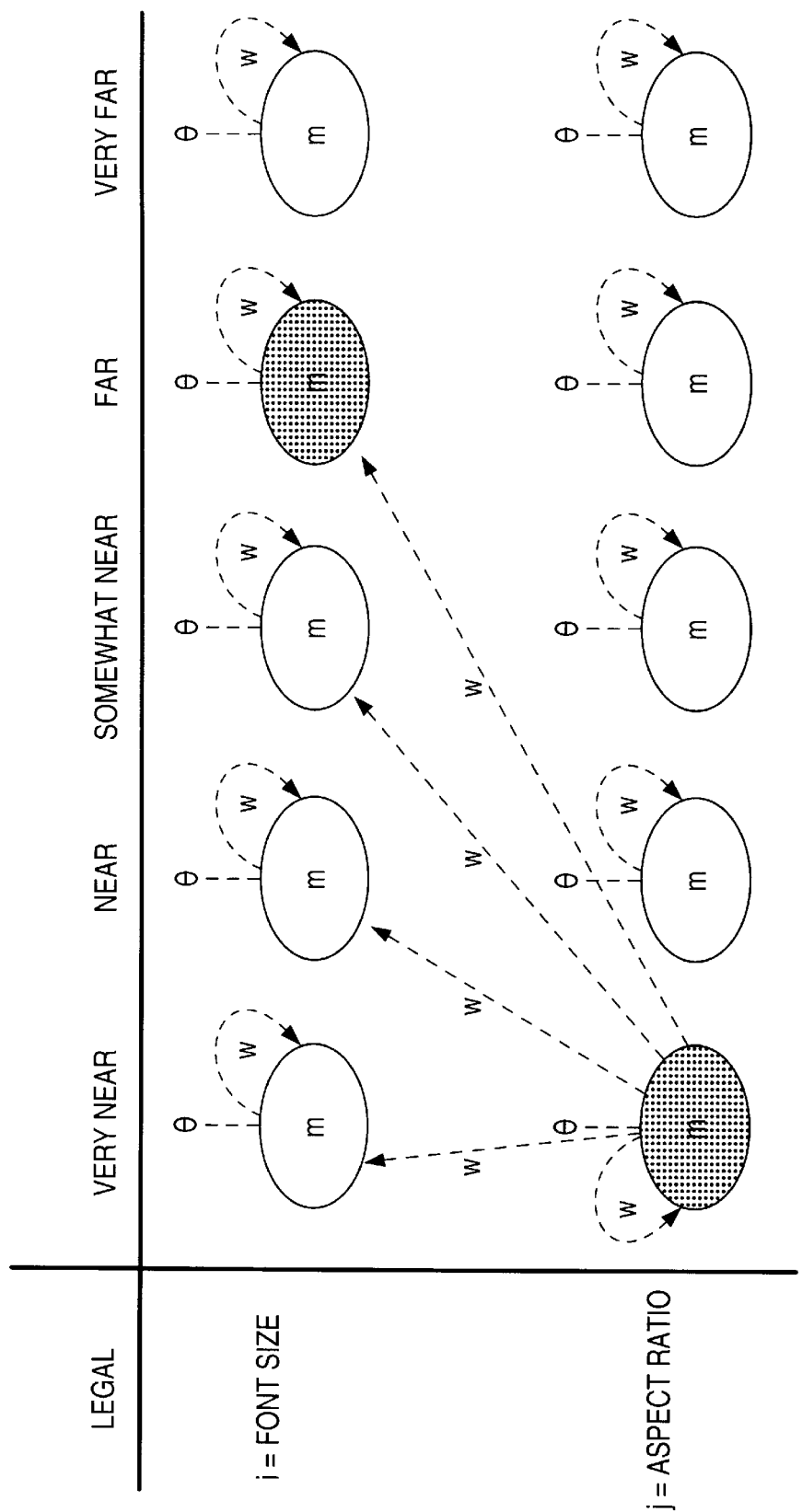

PATTERN RECOGNITION CONSTRAINT NETWORK

BACKGROUND OF THE INVENTION

1. Field of the Invention

The present invention relates to a pattern recognition system that, in one embodiment, may be used in a document analysis system.

2. Description of the Prior Art

Pattern recognition techniques are often used to classify an unknown item into one of many predefined sets. Examples of technologies that provide these capabilities are:

- neural networks
- binary trees
- K-Means methods

These techniques, called "Classifiers" have been employed in several recent technologies, including Optical Character Recognition, Vehicle Identification, and Scene Analysis.

Pattern recognition techniques can also be used to determine the likelihood that an unknown item belongs to a predefined class of items. These techniques extract features of the unknown item and compare these features to an existing model of the predefined class. The closer the features are to the model, the higher the likelihood that the unknown item belongs to the predefined class.

Pattern recognition techniques may also be used for the purpose of analyzing document images. For example, the ability to automate the process of data extraction from digital images of paper greatly increases the productivity and capacity of any business. By automating the data entry process, operating costs can be reduced due to reduced manpower requirements and capacity can be increased by maximizing the throughput of data entry operations.

One such document analysis system that has been developed is described in co-pending U.S. patent application Ser. No. 08/652,283, filed May 22, 1996, and entitled "Knowledge-Based Document Analysis System". The pattern recognition approach taken in the system described in that patent application is to analyze document format and content by exploiting global document attributes, and to only use local document information when necessary. While the pattern recognition technique described in that patent application provides a robust solution that is highly country and language independent, this prior pattern recognition approach suffers from a number of disadvantages.

SUMMARY OF THE INVENTION

The present invention, called a Constraint Net, is a novel pattern recognition engine that is used to determine the likelihood that an unknown item belongs to a predefined class. The specific uses for this new invention include, but are not limited to, the following:

- accurately locating the important fields on the image of a financial document, such as a business check, personal check, deposit slip, or giro;
- determining the likelihood that connected regions correspond to people in images of a retail or banking scene; and
- differentiating between a hand, objects in a hand, and background objects in the image of a retail self-checkout scene.

The specific enhancements provided by the Constraint Net of the present invention over prior art types of pattern recognition techniques include:

Both feature parameters and confidence parameters are trained automatically from ground truth image data;

Large numbers of different attributes can be analyzed in the model, which yields more accurate modeling;

Relationships between different features can also be trained from ground truth data and represented in parametric form;

Insensitivity to feature noise;

Parameters are based exclusively on statistical information. The need for heuristic information is minimized;

Retraining is straightforward and fast;

On-line updating of model parameters is possible; and

The models created are accurate and reliable at predicting the match of an unknown item to the model.

BRIEF DESCRIPTION OF THE DRAWINGS

FIGS. 1A–1D and 2 are block diagrams illustrating the present invention in various embodiments.

FIGS. 4–5, 8, 10, 13–14 and 17–18 are various pictographs representing features and associated fuzzy values that may be used by the present invention.

DETAILED DESCRIPTION OF THE INVENTION

Figure 1A:
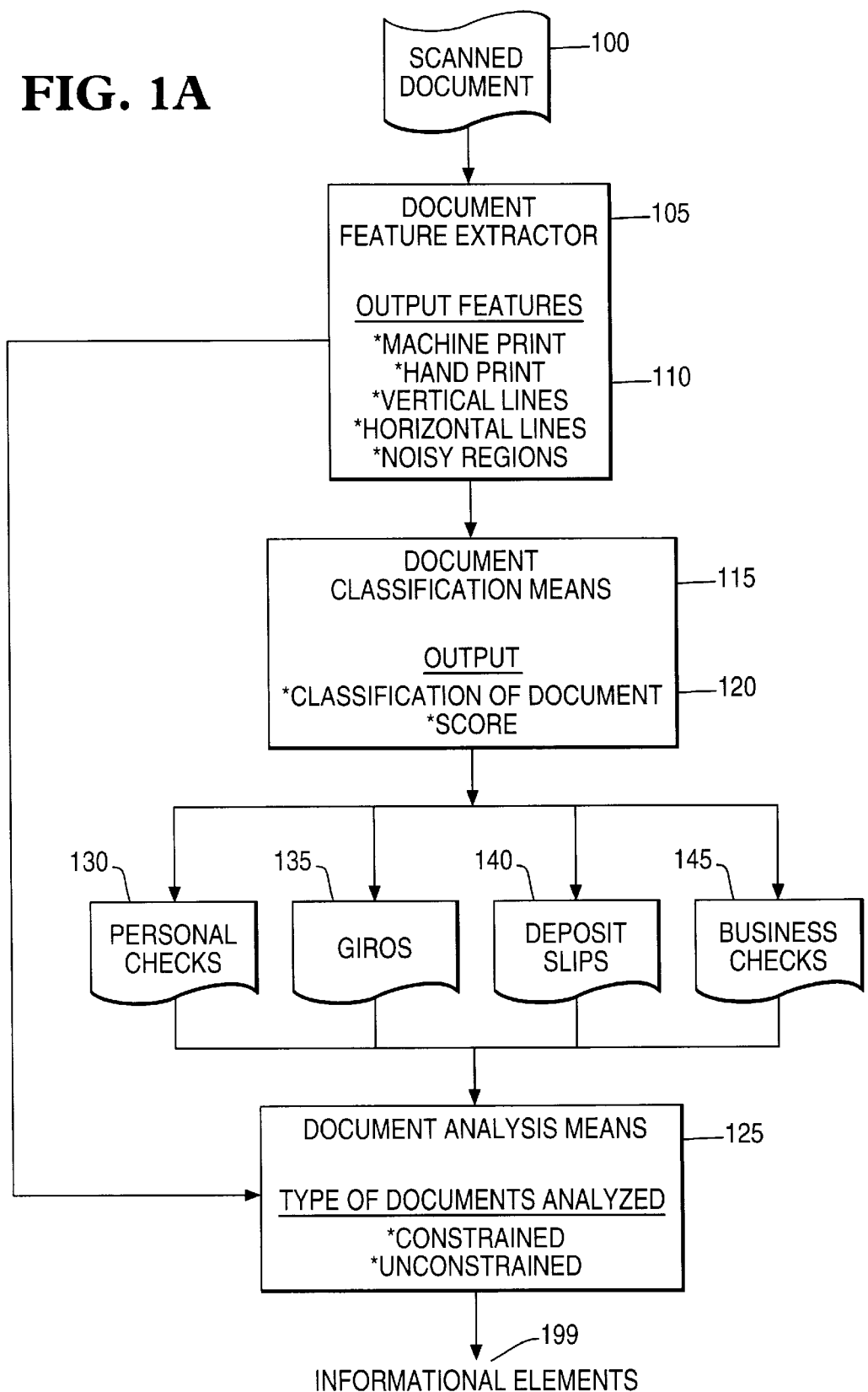

A preferred embodiment of the invention is now described in detail. Referring to the drawings, like numbers indicate like parts throughout the views.

To explain the capabilities of the Constraint Net of the present invention, an example for which a Constraint Net has been deployed will be described below. A prior version of this example, called a Document Analysis System, is described in detail in co-pending U.S. patent application Ser. No. 08/652,283, filed May 22, 1996, and entitled "Knowledge-Based Document Analysis System", and incorporated herein by reference.

The prior Document Analysis System described in U.S. patent application Ser. No. 08/652,283 will be contrasted below to the version of this system employing the Constraint Net reasoning system of the present invention.

1. The Document Analysis System of FIG. 1A

Referring to FIG. 1A, the input to the Document Analysis System is the scanned image of an unknown document 100. Document 100 contains fields of data which are informational elements 199. For example the informational elements for a business check include the signature line, courtesy amount, legal amount, MICR and date.

In the preferred embodiment a TIFF format scanned image is used, grey-scale (8 bits/pixel) or binary, 200, 240, 254, 300, 400, 600, 1200 or 2400 dpi (or equivalent), both sides of the image should be scanned and any orientation of the image is supported. The image may be uncompressed (raw) image, or a compressed (binary or grey) image. However, any image type is readily usable. The image scanned may be stored on any storage media including hard disk.

From the scanned image 100 it is possible, using a Document Feature Extractor 105 to locate and identify basic features of the document. These basic features may include machine print, hand print, vertical lines, horizontal lines and noisy regions within the digital image of the document 110.

The Document Feature Extractor 105 identifies the four corners of a rectangle that enclose individual document features. Features that are positioned close to one another or of the same type may be clustered into a single feature. For example, characters that compose an individual machine print word may be grouped into a single machine print feature, as well as multiple machine print words that are located close together within the document. The output of the Document Feature Extractor is the location and type indicator for each document feature. An example of a Document Feature Extractor 105 is the one that is available from NCR Corporation.

Other features, systems and methods that can be used as the Document Feature Extractor or as part of the Document Feature Extractor are disclosed in *A High Speed Image Understanding System* in *Adaptive Analog VLSI Neural Systems* by M. A. Jabri, R. J. Coggins, and B. G. Flower, published by Chapman & Hall 1996, ISBN 0-412-61630-0; *Analysis of Complex and Noisy Check Images, Proceedings of IEEE International Conference on Image Processing*, pp. 316–319, published by IEEE Computer Society Press 1996, ISBN 0-8186-7310; *A Neural Network Accelerator for Image Analysis, IEEE Micro*, vol. 15, number 3, June 1995, published by IEEE Computer Society Press 1995; *Net32K High Speed Image Understanding System, Proceedings of the Fourth International Conference on Microelectronics for Neural Networks and Fuzzy Systems* (Microneuro '95), pp. 413–421, published by IEEE Computer Society Press 1995; *Address Block Location with a Neural Net System, Advances in Neural Information Processing Systems*, vol. 6, pp. 785–792, published by Morgan-Kaufman Publishers 1994.

The location and type indicator for each document feature is passed to the Document Classification Means 115. The Document Classification Means 115 identifies the general document class of the document scanned from the set of low level features extracted by the Document Feature Extractor 105. A general document class is for example fixed format document with a high degree of linear features such as European giros or single fixed format documents such as United States ANSI standard personal checks or an unconstrained document such as a business check.

The output of the Document Classification Means 115 is an ordered list of classification hypotheses, consisting of a document type identifier and a score which indicates the confidence level of the hypothesis 120.

The output features 110 of the Document Feature Extractor 105 and the ordered list of classification hypotheses 120 from the Document Classification Engine 115 are passed to the Document Analysis Means 125. The Document Analysis Means 125 locates relevant areas or zones within the document. For example, for a U.S. business check 145 or personal check 130, the Document Analysis Means 125 outputs the location and print type of the courtesy amount, legal amount, MICR, date, and signature zone.

Details of the Document Analysis Means are described below.

Again, additional details regarding the Document Feature Extractor 105 and the Document Classification Means 115 are provided in co-pending U.S. patent application Ser. No. 08/652,283, which is incorporated herein by reference.

In the preferred embodiment of this invention, the code for the Document Feature Extractor 105, Document Classification Means 115 and the Document Analysis Means 125 may be written in Microsoft Visual C++. The software may run on an Intel 486, Pentium, Pentium Pro, Pentium II or equivalent platform under Windows NT or Windows 95. It also may utilize the Win32 application subsystem. Suitable equivalents to the systems described above may also be used.

Figure 1B:
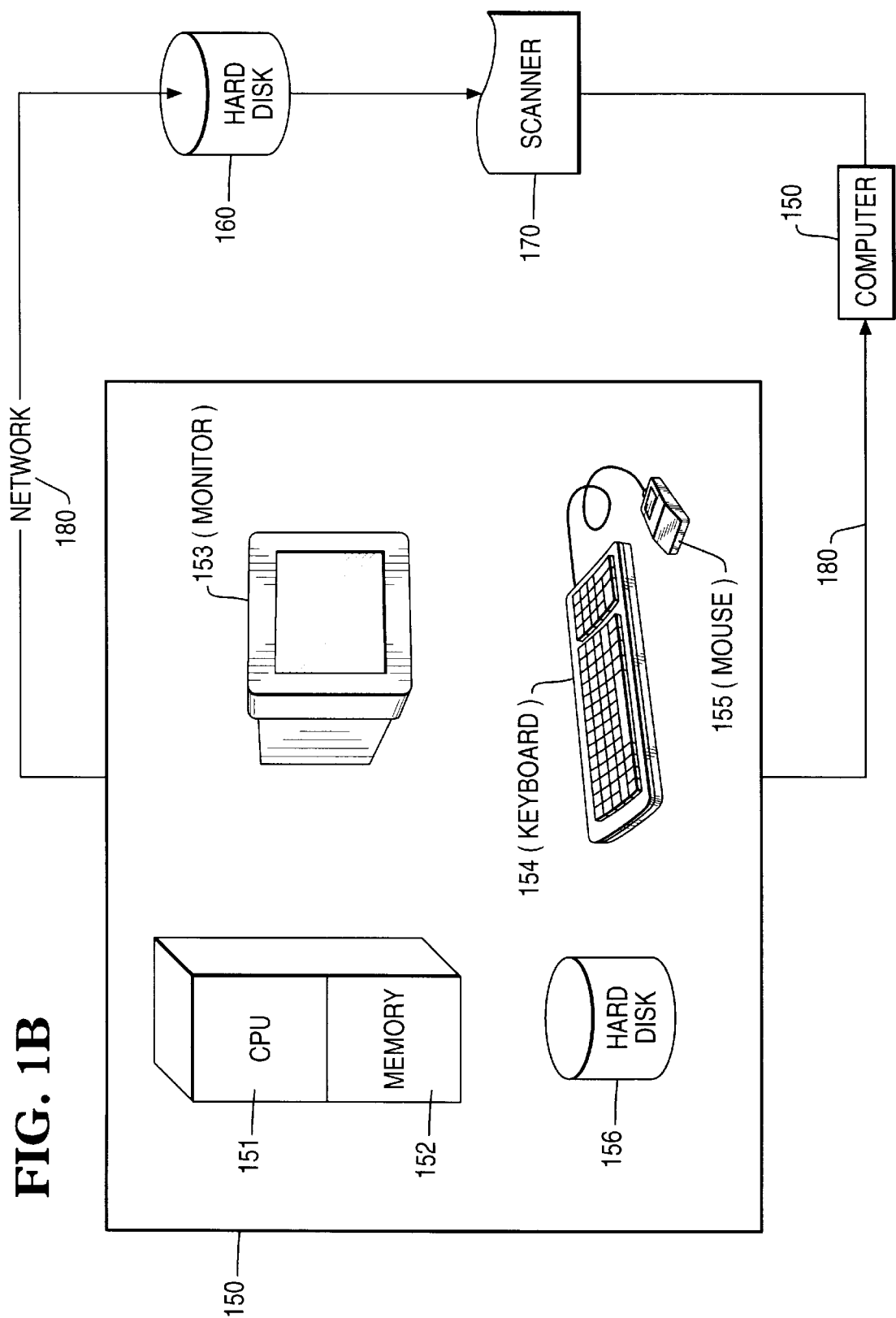

Moreover, one embodiment for implementing the present invention is depicted in FIG. 1B. A computer 150 is shown which contains a monitor 153, a keyboard 154, a mouse 155, a central processing unit (CPU) 151 which can be an Intel 486, Pentium, Pentium Pro, Pentium II (or equivalent), memory 152 and hard disk 156 (or equivalent). The computer 150 may be connected to a network 180, which may contain hard disks 160, scanner 170, etc. The scanner 170 may be used to scan and digitize a document into an image that can be stored either on hard disks 156 or 160, etc. While this configuration is disclosed in one embodiment, equivalent hardware systems may also be substituted.

Also, the various processes described in the present invention may readily be implemented on the computer system described with respect to FIG. 1B.

The Document Analysis Means 125 processes constrained and unconstrained documents differently. If the document is identified by the Document Classification Means as constrained, the document analysis means sorts through various model documents of the type identified and extracts the fields that are relevant for the document identified. For personal checks, the document model file is accessed, and the relevant fields are located. For giros and deposit slips, the system sorts through various model files for the type of document and the relevant fields are located. The sorting through files for giros and deposit slips may be accomplished by systems that process constrained documents such as the DP-ATM Model 5665 produced by NCR in Dundee, Scotland. For unconstrained documents, the problem is more complex. We therefore start by explaining the problem solving model used by the invention of co-pending U.S. patent application Ser. No. 08/652,283. Most problem solving models generally use a backward-reasoning process or forward-reasoning process in order to construct a solution. In a backward-reasoning approach, the system attempts to reason backward from a goal to be achieved to an initial data state. This type of system is often implemented as a rule based system, where if-then rules are defined and the system performs inference in order to work backwards from the goal state to the initial state. This problem approach is similar in nature to top-down model based problem solutions. In forward reasoning, the system attempts to reason forward from the initial data state to the goal state. Again, this is often achieved by inference rules, with the rules being applied to the current set of information until a goal state is found. This problem approach is very similar to bottom-up data driven problem solutions. Regardless of the model selected, both approaches require the system to determine when and how information should be applied to generate the problem solution.

Rather than be bound by either solution model, the document analysis system applies information in an opportunistic manner. Dependent upon the state of the system, the system dynamically determines which of the two approaches will yield the most useful information to derive a solution. To achieve this dynamic process flow, the document analysis system is implemented as a blackboard architecture. Referring to FIG. 2, the document analysis means 125 consists of three components: knowledge sources 231, 232 and 233, a control module 250, and a knowledge database 210.

The knowledge database (also called a "data depot") 210 is the repository of all information and data in the system. The knowledge database 210 contains general a priori knowledge in the form of document models, specific information about the current image being processed, as well as hypotheses created by the system. The knowledge sources 231–233 communicate with each other via the knowledge database 210.

Knowledge sources 231–233 consist of a set of procedures or subsystems that are invoked to add to the current set of information contained within the knowledge database 210. Inputs to knowledge sources are stored in the knowledge database. The output of each knowledge source is stored in the knowledge database so that other knowledge sources can access the data. Knowledge sources may be simple procedures, or in some instances may be complete systems, such as the field understanding engines such as optical character recognition systems.

A control module (also called a "scheduler") 250 is required to control the firing or invocation of knowledge sources 231–233. The control module monitors the state of the knowledge database 210, determining the best knowledge source to activate given the current state of the system. This scheduling activity is where the system selects to perform forward reasoning versus backward reasoning.

2. The Constraint Net

Although the Constraint Net of the present invention may be used in a variety of applications, its application to the Document Analysis System of FIGS. 1–2 (and described in U.S. patent application Ser. No. 08/652,283) will now be described. Given an image of an unknown financial item, the document analysis system of FIG. 1A performs the following functions:

determines the class of the unknown item, such as business check, personal check, deposit slip, or giro; and finds the location of important zones on the item, such as the courtesy amount, legal amount, date, signature, and codeline.

The document analysis means 125 of co-pending U.S. patent application Ser. No. 08/652,283 employs models to locate and identify documents and document fields (such as courtesy and legal amount, MICR, date, and signature zones). The models employ parameters called attributes that represent the composite statistical and heuristic information gathered from training set images. The parameters allow a reasoning engine to rank candidates, denoting how much each attribute, or feature, contributes to the candidate's likelihood of representing a desired document aspect.

The previous version of the document analysis system described in U.S. patent application Ser. No. 08/652,283 employs both statistical and heuristic information to form parameters used in a rule-based document zone model. These rules comprise a knowledge source in the invention of U.S. patent application Ser. No. 08/652,283.

Examples of rules are:

If the center of the candidate zone is within 20 pixels of (800,400), add 0.3 to the confidence that the candidate zone is a courtesy zone.

If the candidate zone is enclosed in a box, add 0.3 to the confidence it is a date zone.

The examples below delineate the two types of parameters used in the previous version of the document analysis system:

feature parameters that denote aspects of an candidate zone, such as zone location, and the degree to which they match a desired zone; and confidence parameters that denote the level of positive or negative contribution to the confidence value (CV) that a candidate zone receives depending on the degree of feature match.

In the previous version of the document analysis system, four features were used to represent a candidate zone. These were:

type (machine print or handprint)

location (x,y location in image)

size (width and height in pixels)

enclosed (within a box)

The training procedure for the previous version used document images and ground truth data from a training set to extract statistical feature parameters for the location and size features for each zone type (courtesy, legal, etc.). The statistical data gathered was the mean value for the features, for each zone type. Heuristic information was used to determine confidence parameters.

For example, if the mean location for the courtesy zone on business checks is (800,200), and the range of mean values is small, the confidence value of candidate courtesy zone candidate having this location would have been increased quite a bit.

Since "enclosed" and "type" are features that have fewer alternative values, the mean values gathered was used to set confidence parameters, i.e. if 75% of date zones are enclosed, the confidence for an enclosed date zone candidate should have been increased. However, the value of the confidence parameter was heuristically determined.

The features of a zone across a group of documents are rarely identical in the previous version of the document analysis system. Aspects of the features vary from document to document, such as courtesy zone locations for two different types of business checks. Even between two documents that are printed by the same source, features such as noise, zone location, and amount of text may vary.

The current document analysis system substitutes the Constraint Net of the present invention for the rules described above. The Constraint Net is explained in further detail below, and the document analysis system is used as an example of its application to a real world problem.

A. Introduction to Constraint Nets

The old model, as described above, uses heuristic information and simplified, mean value statistics, and a small number of features in order to form the zone models for these financial documents. The Constraint Net of the present invention replaces these rules by using a much larger feature set, more sophisticated statistical mechanisms for improving the accuracy of zone models, and removes the need for heuristic information that may have created unexpected biases in the ranking of candidates. The Constraint Net therefore can be used as a new model for zones, which can become a new knowledge source in, for example, a document analysis system.

Figure 1C:
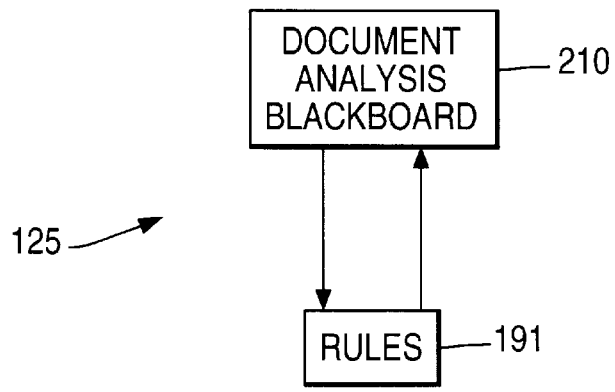
Figure 1D:
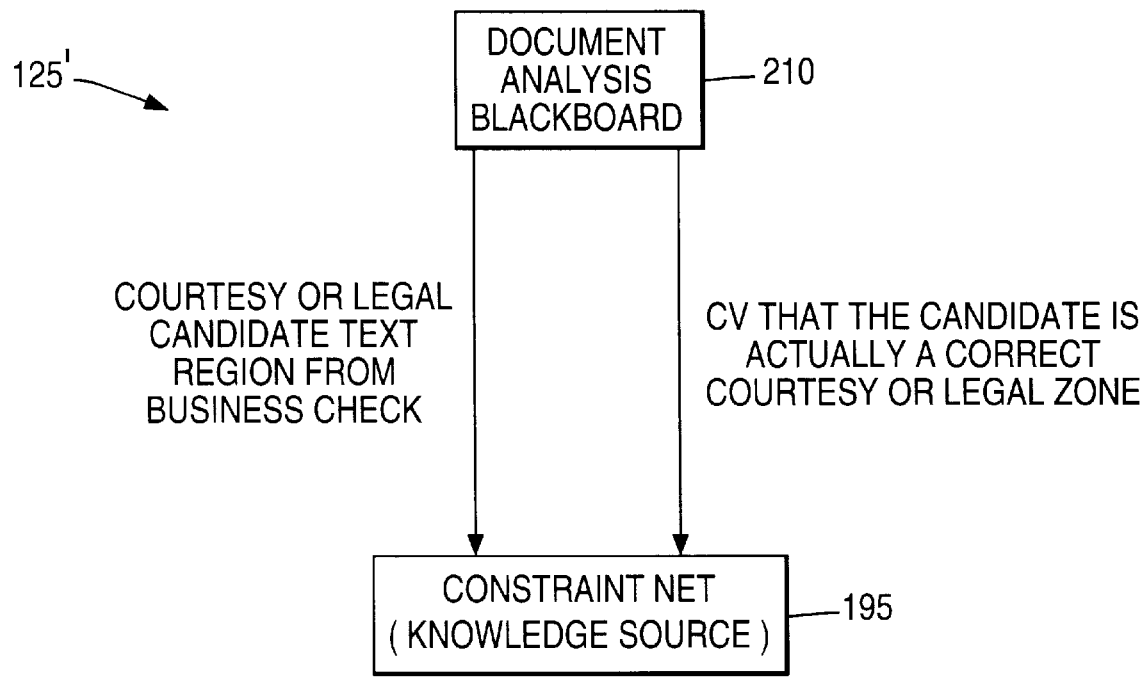

As shown in FIGS. 1C and 1D, the Constraint Net 195 of the improved invention replaces the rules 191 that were previously employed with the document analysis blackboard/knowledge database 210 (FIG. 2) of the Document Analysis System 125 (see also FIG. 1A and associated written description) to create an improved Document Analysis System 125' to generate zones.

B. Model and Feature Variations

From the above discussion, two types of variations can be identified:

model variations feature variations

Model variations occur when a particular aspect of a particular model is significantly different between two instances of the same model. Using the document analysis example, in one business check the courtesy zone may be located on the right side of a check; in another on the left. These large variations suggest that more than a simple model is required to accurately represent all of its instances.

Feature variations occur when particular features of a model are slightly different between two items that are highly similar. For example, in one business check, the legal zone may be at location (500,500); in another at (520,540), where (x,y) is the location of the item in pixels. To reduce system brittleness, both checks may be handled by the same model.

C. Handling Feature Variations in the Constraint Net 195 (Fuzzy Values)

Since feature variations exist, the reasoning engine must be insensitive to "imprecisions" in the feature value. In particular, it must be ensure that limited feature variations do not affect model matching. In the following discussion, the term "candidate item" will be used to refer to an item of an unknown class that is being applied to the Constraint Net 195, to see if it matches the model.

To compensate for the inconsistency in feature values, the "crisp" value of each feature in a candidate item will be converted to a "fuzzy" value before evaluating the candidate item. The fuzzy value provides a way of handling small inconsistencies, by grouping the imprecise values into more meaningful terms.

Examples of fuzzy values are: very near, near, somewhat far, far, and very far. A feature value can have more than one fuzzy value, such as "between very near and near." The fuzzy values are assigned by comparing the feature value of the candidate zone to the mean feature value. Features can take values of very small, small, medium, etc. This is described in further detail below.

Figure 3:
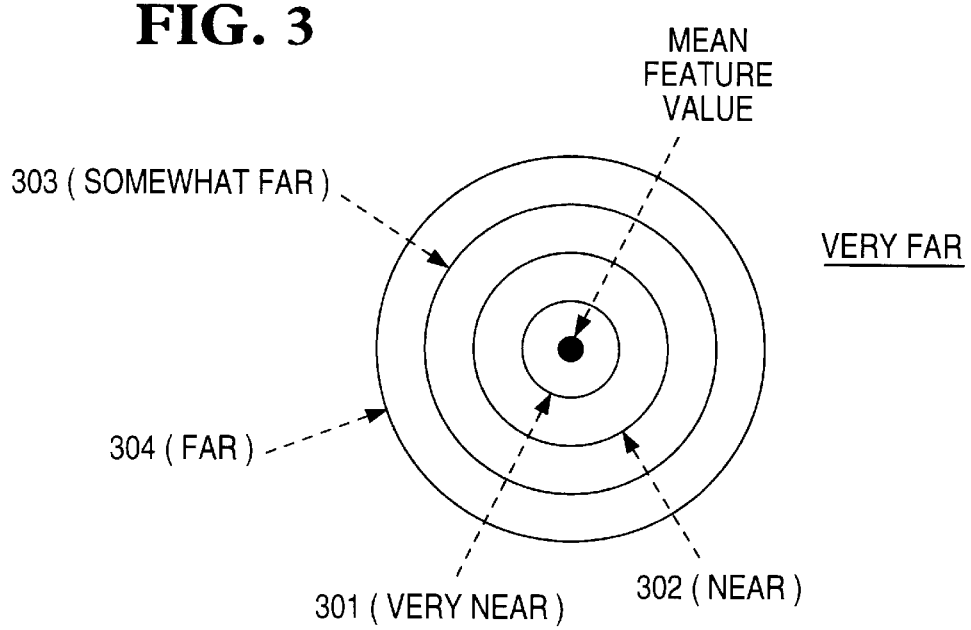
FIG. 3 is a graphical representation of fuzzy values.

The distance between the feature values for a particular candidate and the mean of all feature values in the training set determines the fuzzy value. FIG. 3 demonstrates this process graphically.

The rings (301–304) in FIG. 3 represent deviations from the mean. If the candidate item feature value falls within the innermost ring 301, it's fuzzy value is "very near". If it falls between the innermost and second ring 302, it is "between very near and near". This fuzzy value assignment continues until the outermost ring 304. If it falls outside all rings 301–304, it's fuzzy value is "very far".

D. Constraint Net 195 Elements—A Pictogaph Representation

Figure 4:
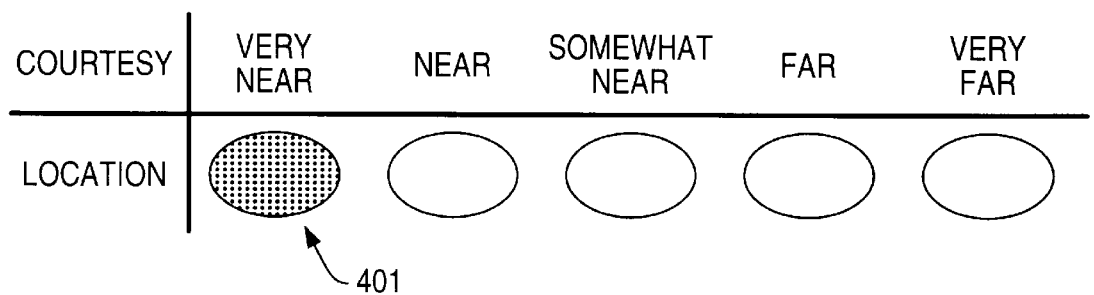

A pictograph similar to that shown in FIG. 4 may be used to represent a feature and its fuzzy value for a particular item. For example, if a candidate zone's location is within 5 pixels of the mean location for a courtesy zone, the pictograph of FIG. 4 would be used, denoting the location is very near (401). Likewise, if a candidate zone's location is 150 pixels larger than the mean width for the legal zone, the pictograph of FIG. 5 may be used, denoting the location is between far (504) and very far (505).

Figure 5:
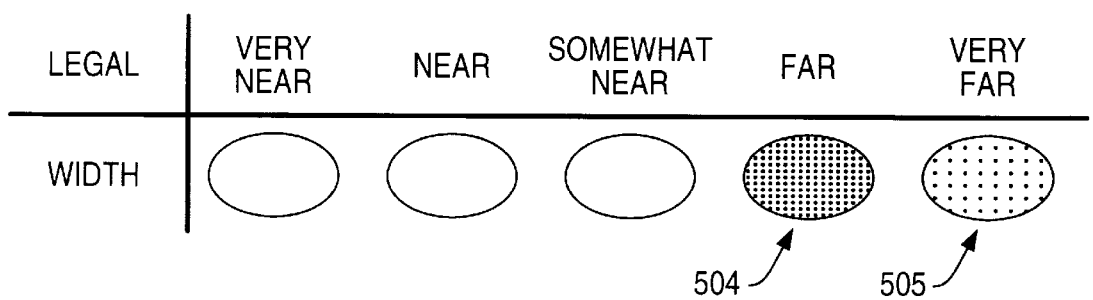

The shading of the "nodes" in the pictograph of FIG. 5 represent the amount of match between the fuzzy value and the candidate item feature. In the example of FIG. 5, the far node 504 is more shaded than the very far node 505 to indicate that the candidate zone feature is between far 504 and very far 505, but closer to far 504. The nodes depicted in FIGS. 4 and 5 form the basic structure of the Constraint Net 195.

E. Assigning Numeric Equivalents to Fuzzy Values

Each fuzzy value may be assigned a membership value between [0,1] that denotes how well the candidate item feature is represented by the fuzzy value. For example, in FIG. 5, the width might be 0.7 far and 0.3 very far. The values 0.7 and 0.3 are membership values and must add to 1.

Membership values are computed by membership functions. These membership functions are contained in each node of the Constraint Net 195. A membership function transforms the candidate item feature value that is provided to a node into a numeric membership value for the given fuzzy value. This membership value is the output of the node. A functional representation is shown in Equation 1 (referred to as Eq. 1) below:

$$\text{membership} = f(\text{mean, fuzzy, feature}) \qquad \text{Eq. 1}$$

Figure 6:
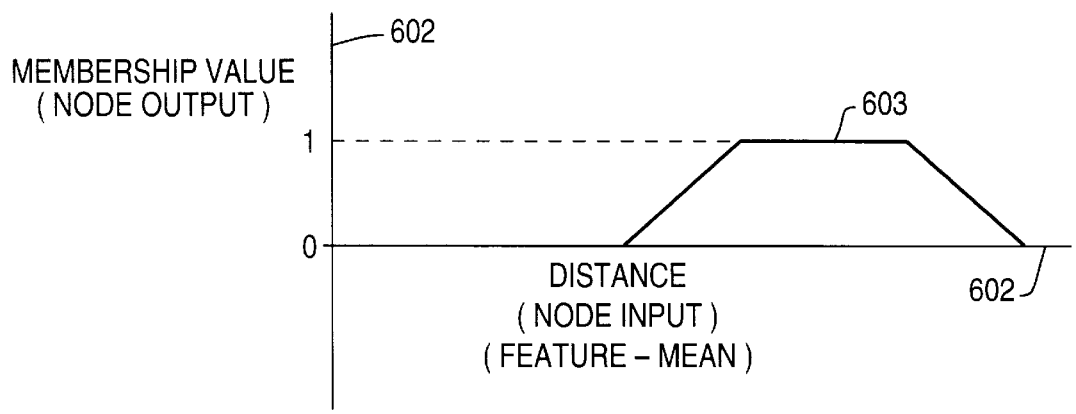
FIGS. 6–7 and 15–16 are membership functions that may be used by the present invention.
Figure 7:
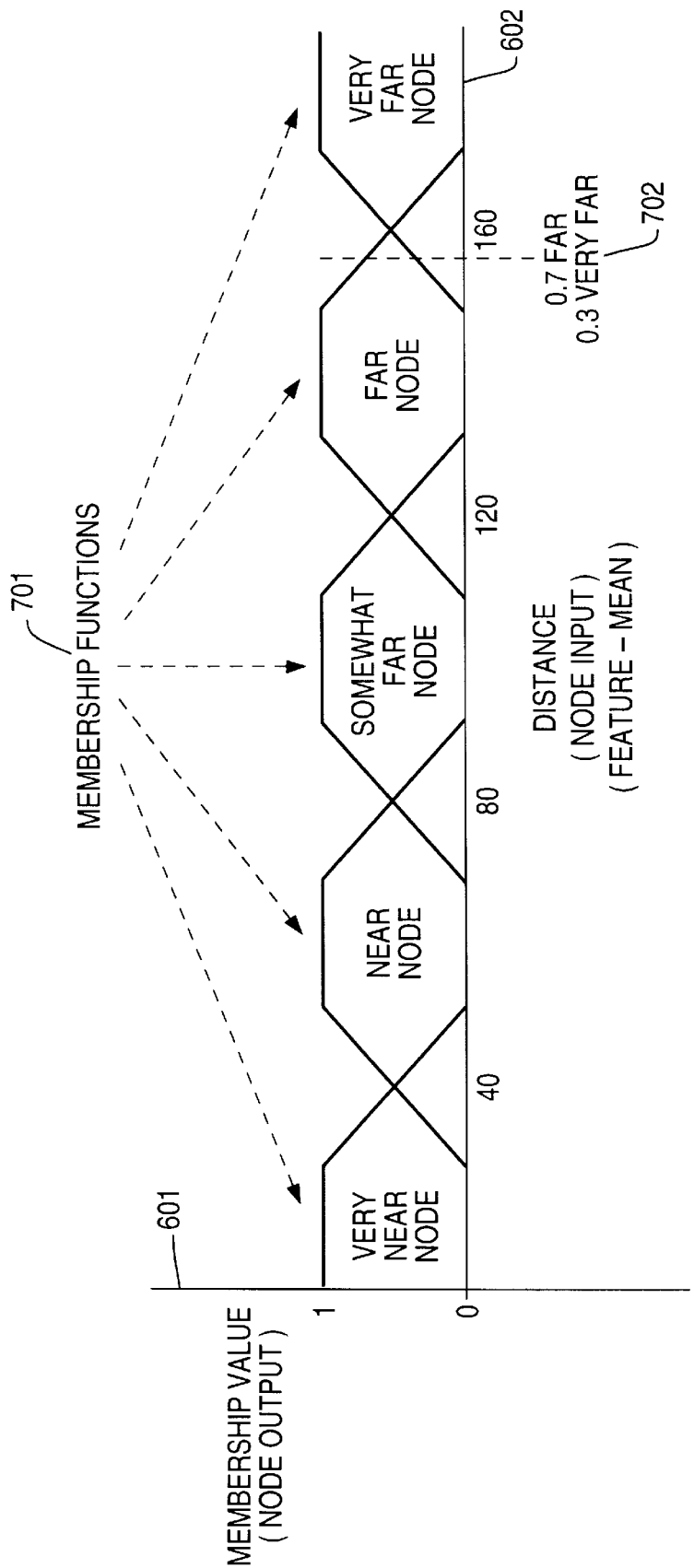

Where:
  f( ) is the membership function
  membership is the membership value
  mean is the feature mean in the model
  fuzzy is the fuzzy value
  feature is the feature value An example of a membership function is shown in FIG. 6, where the relationship between membership value (along axis 601) and distance (along axis 602) is shown as reference numeral 603. Continuing with our legal amount example from the document analysis system, the following set of membership functions 701, depicted in FIG. 7, can be used:

According to the graph in FIG. 7, a distance of 150 from the mean width point 702) corresponds to membership values of 0 for very near, near, and somewhat far nodes, a membership value of 0.7 for the far node, and a membership value of 0.3 for the very far node. The width of the membership functions, and their locations are determined by the widths of the deviations from the mean for the particular feature.

F. Using the Constraint Net 195 in Computing Confidence Value (CV) from Membership Values Again, the candidate item's CV denotes how well the candidate item matches a particular model. Higher CV's denote better candidate item matches; lower CV's denote worse matches.

The match of a candidate item to a model is a function of how well the candidate item's features match the model's features. Using our fuzzy notation, if each feature of the candidate item is very near the mean for each model feature, the CV value will generally be high. As candidate item features become far or very far, the CV value will generally go down.

The following formula (Eq. 2) may be used to denote the contribution of a particular feature i to the CV of the candidate item:

$$\Delta CV_i = \sum_{f \in F} w_i^f m_i^f + \theta_i^f \qquad \text{Eq. 2}$$

Where:
  $\Delta CV_i$ is the change in CV due to feature i.
  F is the set of fuzzy values (very near, near, etc.)
  $w_i^f$ is a weight parameter for fuzzy value f for feature i.
  $m_i^f$ is the membership value of fuzzy value f for feature i.
  $\theta_i^f$ is an offset parameter for fuzzy value f feature i.

In other words, the amount of CV contribution due to a particular feature is linearly related to the membership value for the feature summed across all the fuzzy values plus an offset.

Figure 8:
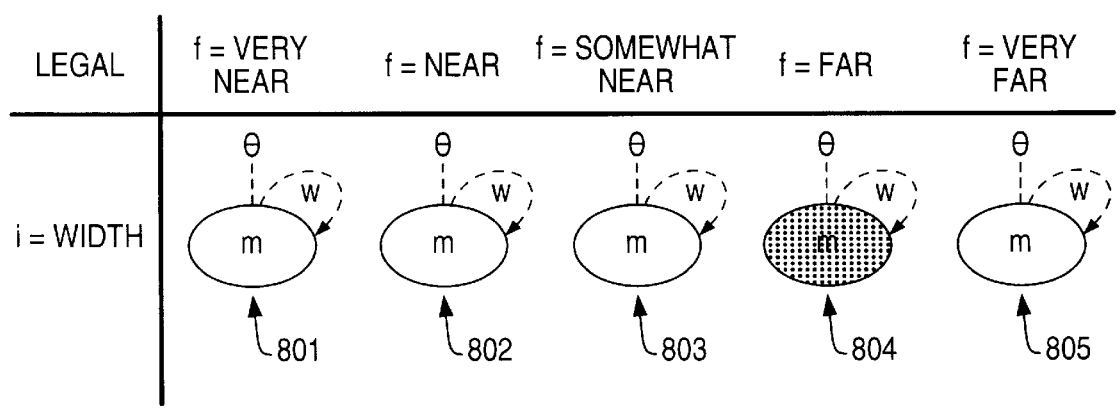

Continuing with the document analysis system example, a pictograph may be used to represent the CV as shown in FIG. 8. Per the previously described example, the CV contribution for the width feature would be:

$$0.7 w_{width}^{far} + 0.3 w_{width}^{very-far} \theta_{width}^{far} + \theta_{width}^{very-far}$$

The model parameters $w_i^f$ and $\theta_i^f$ are confidence parameters, which are used to generate the amount of CV contribution the candidate zone receives for the degree of model match described by the fuzzy value. These parameters are represented in the model by connections between nodes 801, 802, 803, 804 and 805. The $w_i^f$ parameter is called a "weight" connection, and links two nodes together, or a node with itself. The $\theta_i^f$ parameter is called an "offset" connection, that can be used to bias a node.

As an example, if the fuzzy value for a particular candidate item feature i is far, the value $w_i^{far}$ would probably be negative, denoting that the CV should be lowered because the feature is a poor match to the model. Similarly, if the fuzzy value were very near, the value $w_i^{very\_near}$ would probably be large and positive, since the feature is a good match to the model. As denoted by the subscripts and superscripts, the weight parameters are different for each feature and for each fuzzy value.

The value $\theta_i^f$ is an offset parameter that is required for a true linear model. The CV for a candidate item for a given model is given by Eq. 3 below:

$$CV = \sum_{i \in I} \sum_{f \in F} w_i^f m_i^f + \theta_i^f \qquad \text{Eq. 3}$$

In other words, the CV is the sum of the $\Delta CV_i$ contributions for each feature i across the set of all features I for a given candidate item.

G. Converting the Mathematics to a Physical Model

Figure 9:
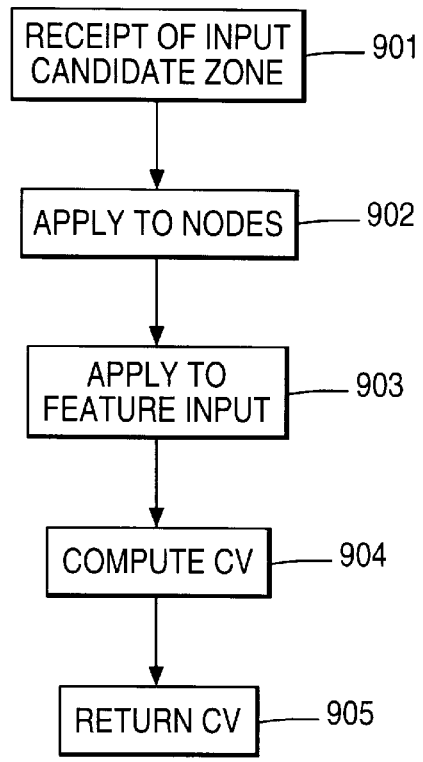
FIGS. 9, 11–12 and 19–22 are diagrams depicting processes that may be performed by the present invention.

From a physical model viewpoint, the Constraint Net 195 (implemented for example on computer 150 of FIG. 1B) performs the following steps when evaluating a candidate zone. The numbers in [brackets] refer to like-numbered reference numerals in FIG. 9

[901] The Constraint Net 195 receives an input candidate item;

[902] The Constraint Net 195 applies the feature inputs to its nodes;

[903] The Constraint Net 195 nodes apply their membership function to the feature input and output a membership value;

[904] The Constraint Net 195 computes the CV for the input candidate zone using the weighted links, bias links, and node outputs; and

[905] The Constraint Net 195 returns this CV.

H. CV Contributions from Feature Relationships

The previous document analysis system described in U.S. patent application Ser. No. 08/652,283 assigned confidence values based on the degree of match for each individual feature. However, in document analysis and other applications, features may have other relationships that affect the CV value for a candidate item. Using the document analysis system as an example:

a font size far from the mean may contribute positively to the CV (i.e. have a positive $w_{font\_size}^{far}$), an aspect ratio very near the mean may contribute positively to the CV (i.e. have a positive $w_{aspect\_ratio}^{very\_near}$), both features taken together may contribute negatively to the CV.

This second-order feature relationship can be modeled using existing nodes, but with additional confidence parameters. Specifically, a new weighted link w "connects" between a node of one feature type and a node of another feature type to model the relationship between the two. The new weights are represented by the notation $w_{ij}^{fg}$, where i is the first feature, j is the second feature, f is the fuzzy value for the first feature, and g is the fuzzy value for the second feature. Using the document analysis example, a pictograph representation is shown in FIG. 10.

The change in CV due to the relationship between a pair of features (i,j) is described by Eq. 4 below:

$$\Delta CV_{ij} = \sum_{f \in F} \sum_{g \in F} w_{ij}^{fg} m_i^f m_j^g \qquad \text{Eq. 4}$$

It is clear from the equation that $w_{ij}^{fg}$ is the cross-correlation between the two fuzzy values. The sum of cross-correlations between the fuzzy values for the two features yields the amount of CV contribution for the feature relationship. It is also possible to represent higher order relationships in the model using additional nodes.

Restricting the model to first and second order relationships only, the total CV for a candidate item is given by the following equation Eq. 5:

$$CV = \sum_{\substack{i \in I \\ j \in I}} \sum_{j > i} \sum_{f \in F} \sum_{g \in F} w_{ij}^{fg} m_i^f m_j^g + w_i^f m_i^g + \theta_i^f \qquad \text{Eq. 5}$$

Eq. 5 represents the sum of all relationships for each fuzzy value, for each feature and each pair of features.

I. Training the Constraint Net 195

The CV of a candidate zone, given by Eq. 5, contains two sets of parameters:

feature parameters, represented by the membership values m;

confidence parameters, represented by the weights w and the offsets θ

The goal of training is to determine the feature parameters and confidence parameters in the reasoning engine such that the CV generated by the engine is high when a candidate item's features match those of a zone model, and low when they don't. The determination of feature parameters and assignment of confidence parameters is accomplished using a training set of items that represent the same model, and a set of items that represent different models.

J. Determining Feature Parameters

Figure 11:
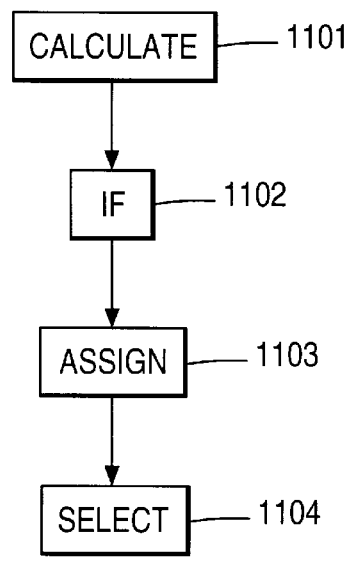
Figure 12:
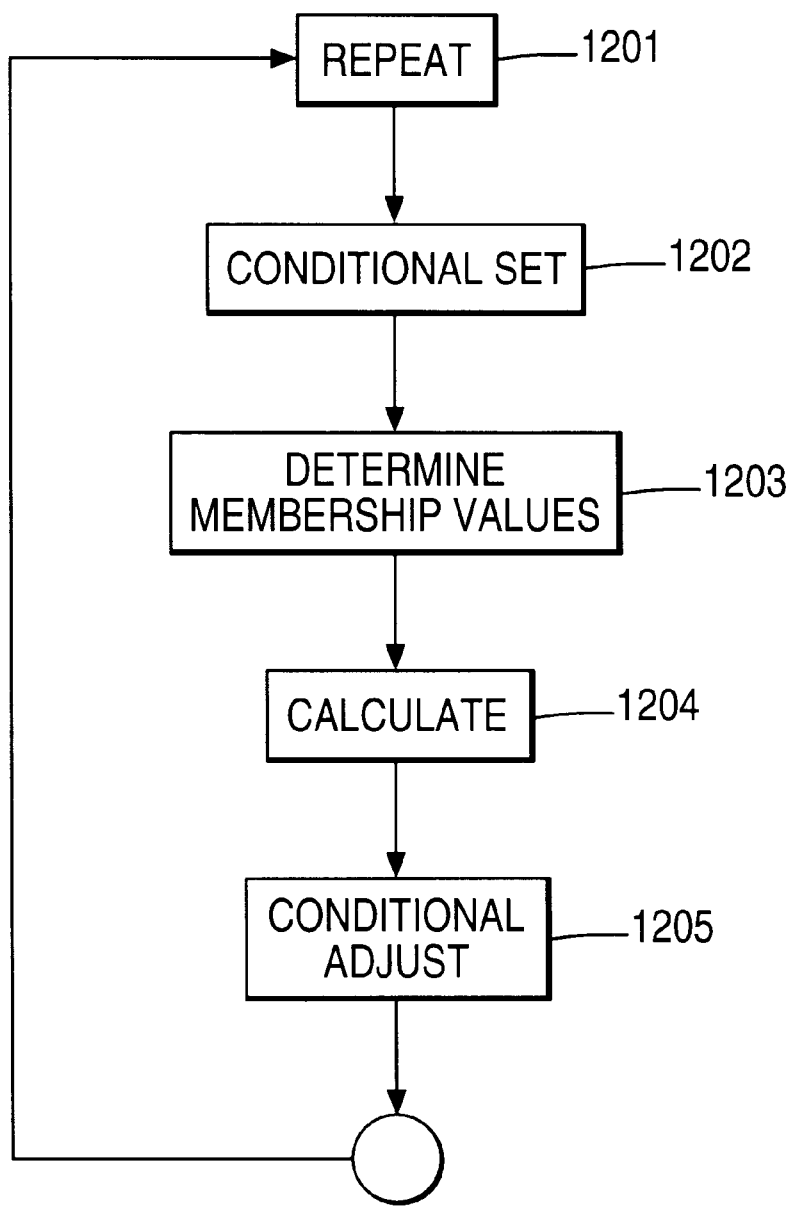

The following procedure, described with respect to FIG. 11, is followed for each item in order to determine feature parameters. The numerals in [brackets] refer to like-numbered reference numerals used in FIG. 11:

[1101] The mean value for each feature is calculated for the item across all the training items;

[1102] If the values for a particular feature are not at least moderately clustered around the mean, a model variation may exist. This is described in further detail elsewhere;

[1103] The fuzzy values for each feature are assigned based on deviations from the mean for the training items; and

[1104] A set of membership functions are selected.

The feature parameters m, which are dependent upon the feature means, fuzzy values, and membership functions, have now been determined.

K. Determining Confidence Parameters

The training of confidence parameters is less straightforward. To begin with, a model is selected for training. After assigning initial random values to its confidence parameters w and θ, the procedure alternates between examples of training items that correspond to the model, and training items that do not correspond, to adjust the confidence parameters and yield a correct CV. This procedure is designed to force the parameters of the reasoning engine to distinguish between what constitutes the model, and what does not.

The following procedure is used for the set of feature parameters corresponding to a given model:

[1201] Repeat for each item in the training set:

[1202] If the item is the same type as the model, set the target CV value to 1. If the item is a different type, set the target CV value to 0.

[1203] Determine the membership values for the features of the item.

[1204] Calculate the current CV using the membership values and the current set of confidence parameters.

[1205] If the current CV and target CV differ, adjust the confidence parameters accordingly.

This procedure is repeated until the target CV values sufficiently match the current CV values.

The method for adjusting the confidence parameters is based on gradient descent. The goal is to minimize the following value of Eq. 6:

$$E = \sum_{t \in T}(CV_t - CV_t^*)^2 \qquad \text{Eq. 6}$$

In this equation, T represents the set of training examples, $CV_t^*$ is the target CV for a training example t, and $CV_t$ is the current CV value for the example. It can be shown that this function is positive-definite, which indicates a convex function with a single minimum.

The gradient adjustment at each step is shown below in Eqs. 7, 8 and 9:

$$\frac{\partial E}{\partial w_i^f} = \sum_{t \in T} 2[m_i^f]_t (CV_t - CV_t^*) \qquad \text{Eq. 7}$$

$$\frac{\partial E}{\partial w_{ij}^{fg}} = \sum_{t \in T} 2[m_i^f m_j^g](CV_t - CV_t^*) \qquad \text{Eq. 8}$$

$$\frac{\partial E}{\partial \theta_i^f} = \sum_{t \in T} 2(CV_t - CV_t^*) \qquad \text{Eq. 9}$$

In the above Equations 7, 8 and 9, t is an element of the training set T.

L. Alternative Formulation of Confidence Values

If a model consists of many features, it may require much time to evaluate a candidate item. If the goal of the overall system is to find the best match of the model, given a set of candidate items, this may be become a protracted process. It would be useful if the model could quickly evaluate each candidate item using a subset of features, and "toss out" those items that clearly don't fit the model.

One way to solve this problem is to force the Constraint Net 195 to output a CV of 1 by default. Individual features from a candidate item are evaluated one by one. Each feature evaluation either lowers the CV, or lets it remain the same. The optimum candidate item can be rapidly found using a dynamic programming approach by always evaluating the next feature of the candidate item with the highest CV. Using this approach, the candidate zone selector is not required to evaluate every feature of every candidate item.

It is possible to reformulate the equation for generating the CV and method for training the confidence parameters without loss of generality. The reformulation follows:

A new term, P, may be defined such that Eq. 10 below is satisfied:

$$P = \sum_{i \in I} \sum_{\substack{j>i \\ j \in I}} \sum_{f \in F} \sum_{g \in F} w_{ij}^{fg} m_i^f m_j^g + w_i^f m_i^g + \theta_i^f \qquad \text{Eq. 10}$$

We see that P is formulated the same as CV was previously. However, let us define the CV as shown below in Eq. 11:

$$CV = e^{-P} \qquad \text{Eq. 11}$$

We can tell by Equation 11 that, as P increases, CV decreases. If P=0, CV=1. As long as P remains positive, CV remains bounded between [0,1]. To keep P positive, we will restrict our confidence parameters w and θ to be positive values. The effects of using this formulation are as follows:

Since the confidence parameters are always positive, a feature evaluation will always add a positive or zero contribution to P;

A positive contribution to P results in a decreased CV. The greater the contribution, the lower the CV;

Features that are very near the model will usually be assigned low, positive weights, which does not lower the CV much, if at all; and Features far and very far from the model will usually be assigned high, positive weights.

Training using this formulation is similarly modified. The same procedure is used, but the parameter adjustment is altered. The goal is to minimize the following value of Eq. 12:

$$E = \sum_{t \in T}(P_t - P_t^*)^2 \qquad \text{Eq. 12}$$

where:

$P_t^* = \ln(CV_t^*)$
$P_t = \ln(CV_t)$

In this equation, T represents the set of training examples, $CV_t^*$ is the target CV for a training example t, and $CV_t$ is the current CV value for the example. It can be shown that this function is positive-definite, which indicates a convex function with a single minimum.

The gradient adjustment at each step is shown below in Eqs. 13, 14 and 15:

$$\frac{\partial E}{\partial w_i^f} = \sum_{t \in T} 2[m_i^f](P_t - P_t^*) \qquad \text{Eq. 13}$$

$$\frac{\partial E}{\partial w_{ij}^{fg}} = \sum_{t \in T} 2[m_i^f m_j^g](P_t - P_t^*) \qquad \text{Eq. 14}$$

$$\frac{\partial E}{\partial \theta_i^f} = \sum_{t \in T} 2(P_t - P_t^*) \qquad \text{Eq. 15}$$

In the above Equations 13, 14 and 15, t is an element of the training set T.

3. The Constraint Net 195—A Second Approach

It is also possible to utilize a similar methodology to handle model and feature variations without requiring average model values. This is described below.

A. Handling Feature Variations—Fuzzy Values—Second Approach

Since feature variations exist, the reasoning engine must be insensitive to "imprecisions" in the feature value. In particular, it must ensured that limited feature variations do not affect model matching during candidate item evaluation.

To compensate for the inconsistency in feature values, the "crisp" value of each feature in a candidate item is converted to a "fuzzy" value before evaluating the candidate item. The fuzzy value provides a way of handling small inconsistencies, by grouping the imprecise values into more meaningful terms. Again, examples of fuzzy values are: very small, small, medium, large, and very large. A feature value can have more than one fuzzy value, such as "between very small and small."

The fuzzy values are assigned by comparing the feature value of the candidate item to a range of possible values for that feature. The location of this feature value in the range determines the fuzzy assignment. Using document analysis as an example, if the X location (in pixels) of a candidate courtesy zone could range between values of 0 and 1500, the value 10 might be considered "very small," while the value 750 might be considered "medium."

B. Pictograph Representation—Second Approach

Figure 13:
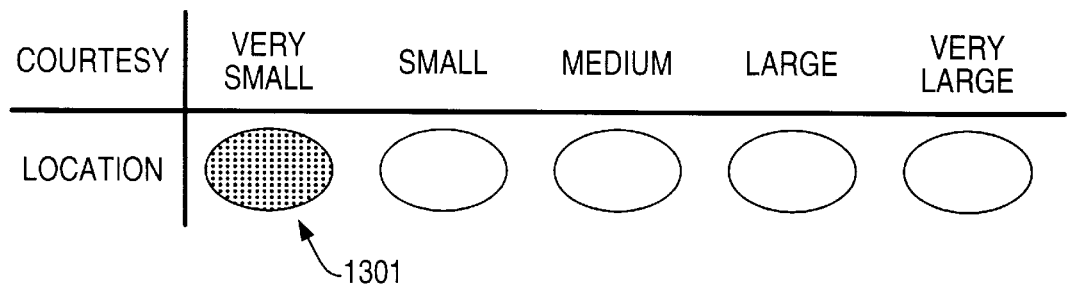

To take an example from the sample Document Analysis System described previously, if a candidate zone's X Location is 10, the pictograph of FIG. 13 may be used when evaluating that candidate zone as a possible courtesy zone, denoting the value is very small 1301.

Figure 14:
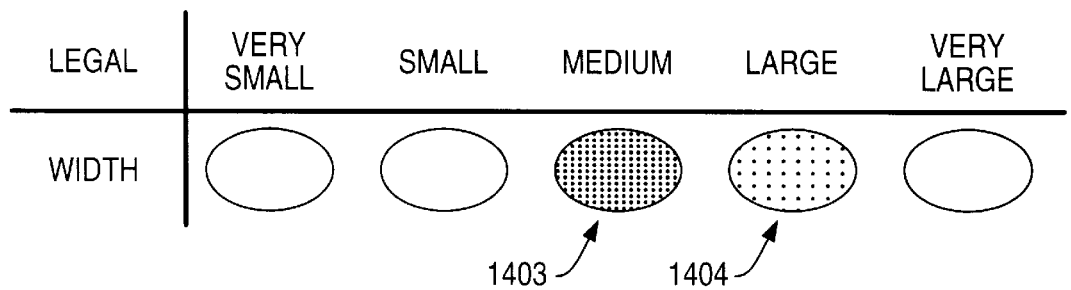

If a candidate zone's X location is 850, the pictograph of FIG. 14 may be used when evaluating that candidate zone as a possible legal zone, denoting the X Location has medium–large size (1403 and 1404).

Again, the shading of the "nodes" 1403, 1404 in the pictograph of FIG. 14 represent the amount of match between the fuzzy value and the candidate item feature. In the above example, the medium node 1403 is more shaded than the large node 1404 to indicate that the candidate zone feature is between medium and large, but closer to medium.

C. Assigning Numeric Equivalents to Fuzz Values— Second Approach

As previously described, each fuzzy value is assigned a membership value between [0,1] that denotes how well the candidate item feature is represented by the fuzzy value. For example, in FIG. 14, we might say that the X Location is 0.7 medium (1403) and 0.3 large (1404). The values 0.7 and 0.3 are membership values and must add to 1.

Membership values are computed by membership functions. These membership functions are contained in each node of the Constraint Net 195 of the present invention. A membership function transforms the candidate item feature value to a numeric membership value for the given fuzzy value. A functional representation of this relationship is shown below as Eq. 16:

$$\text{membership} = f(\text{fuzzy, feature}) \quad \text{Eq. 16}$$

Figure 15:
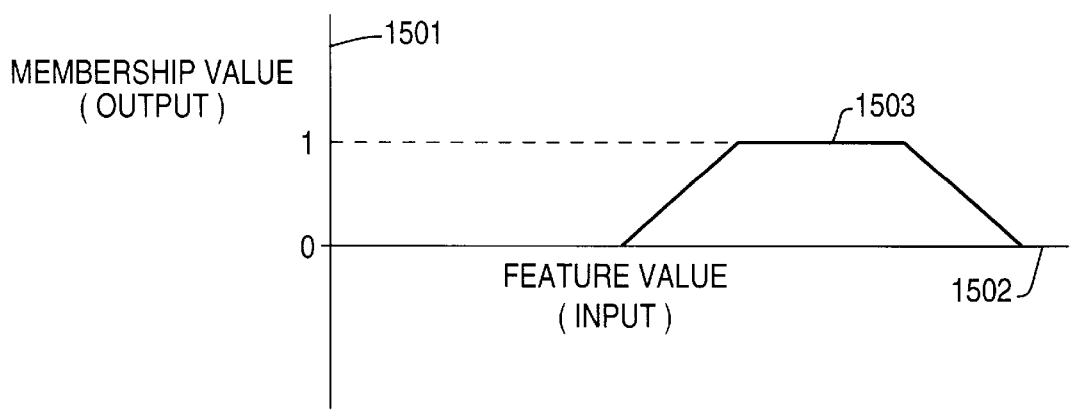

Where:

f( ) is the membership function membership is the membership value fuzzy is the fuzzy value feature is the feature value An example of a membership function is shown in FIG. 15 (which is analogous to FIG. 6). In FIG. 15, the relationship between membership value (along axis 1501) and feature value (along axis 1502) is shown as reference numeral 1503.

Figure 16:
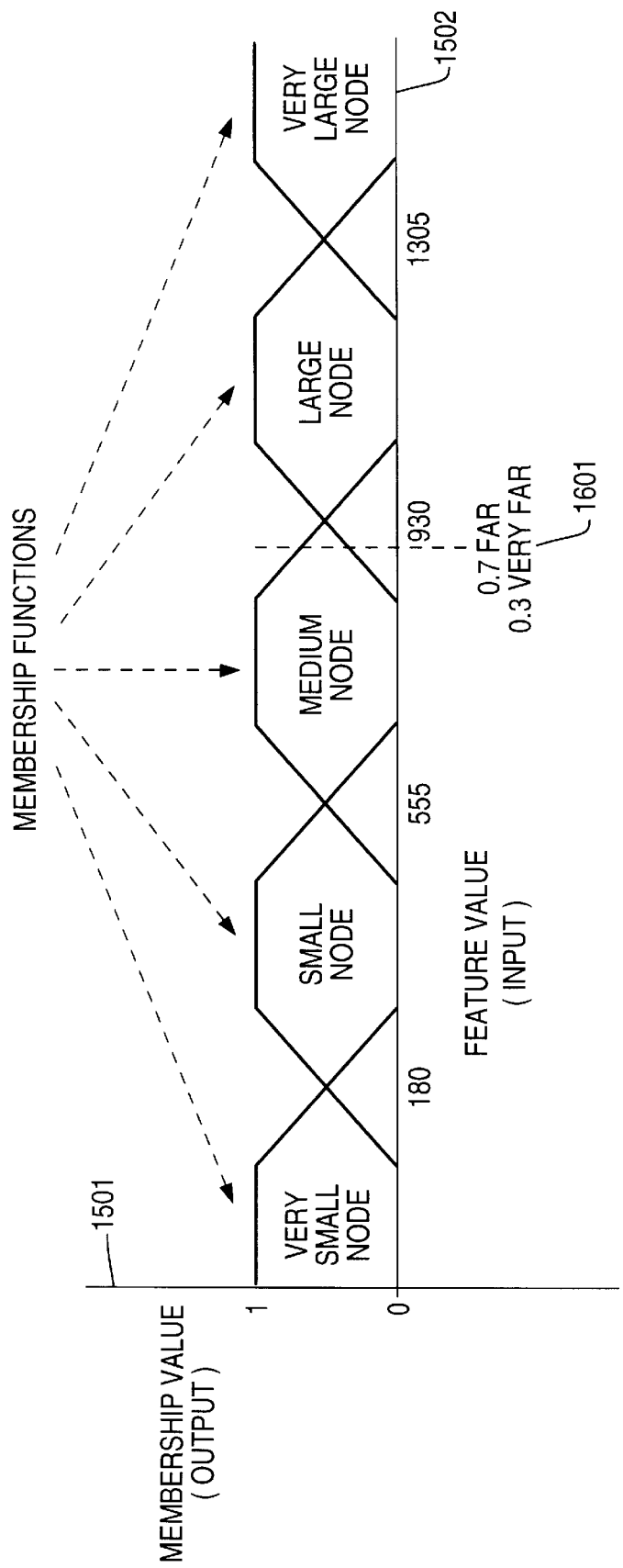

Continuing with the legal amount example from the Document Analysis System, the set of membership functions depicted in FIG. 16 can be used. According to this graph, a value of 850 (at reference numeral 1601) corresponds to membership values of 0 for very small and small nodes, a membership value of 0.7 for the medium node, a membership value of 0.3 for the large node, and a membership value of 0 for the very large node. The width of the membership functions, and their locations are determined by the range of feature values.

D. Computing CV from Membership Values—Second Approach

The candidate item's Confidence Value (CV) denotes how well the candidate item matches a particular model. Higher CV's denote better candidate item matches; lower CV's denote worse matches.

The match of a candidate item to a model is a function of how well the candidate item's features match the model's features. Using the previously described fuzzy notation, if each feature of the candidate item is very near the value for each model feature, the CV value will generally be high. As candidate item features become different from model features, the CV value will generally go down.

The following formula of Eq. 17 may be used to denote the contribution of a particular feature i to the CV of the candidate item:

$$\Delta CV_i = \sum_{f \in F} w_i^f m_i^f + \theta_i^f \quad \text{Eq. 17}$$

Where:

$\Delta CV_i$ is the change in CV due to feature i.

F is the set of fuzzy values (very near, near, etc.)

$w_i^f$ is a weight parameter for fuzzy value f for feature L $m_i^f$ is the membership value of fuzzy value f for feature i.

$\theta_i^f$ is an offset parameter for fuzzy value f feature I.

In other words, the amount of CV contribution due to a particular feature is linearly related to the membership value for the feature summed across all the fuzzy values plus an offset.

Figure 17:
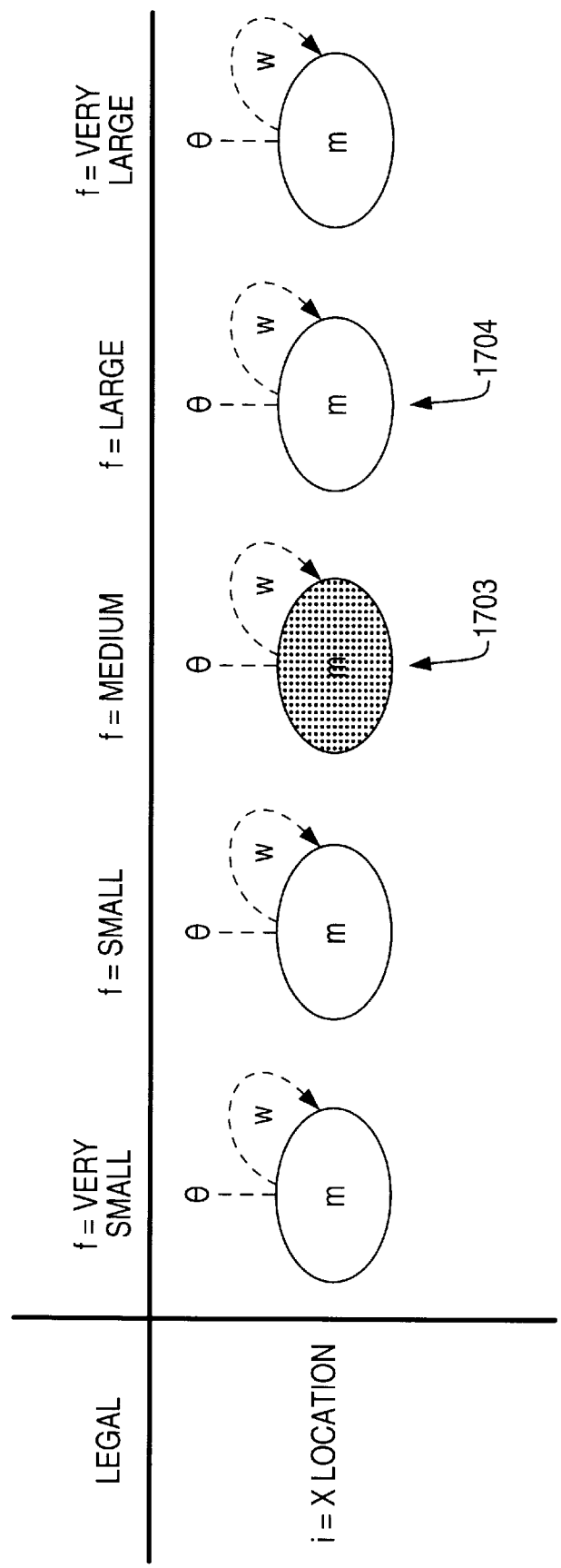

Continuing with the example from Document Analysis System application, the pictograph of FIG. 17 (and shaded nodes 1703 and 1704) may be used to represent the CV as described below. For the example, the CV contribution for the X Location feature is:

$$0.7 w_{XLoc}^{medium} + 0.3 w_{XLoc}^{large} + \theta_{XLoc}^{medium} + \theta_{XLoc}^{large}$$

where the model parameters $w_i^f$ and $\theta_i^f$ are confidence parameters. They are used to generate the amount of CV contribution the candidate item receives for the degree of model match described by the fuzzy value.

For example, if the fuzzy value for a particular candidate item feature i is medium, and the model tends to have very large values for this feature, the value $w_i^{medium}$ would probably be negative, denoting that the CV should be lowered because the feature is a poor match to the model. Similarly, if the fuzzy value were very large, the value $w_i^{very\_large}$ would probably be large and positive, since the feature is a good match to the model. As denoted by the subscripts and superscripts, the weight parameters are different for each feature and for each fuzzy value. The value $\theta_i^f$ is an offset parameter that is required for a true linear model.

The CV for a candidate item for a given model is given by Eq. 18 below:

$$CV = \sum_{i \in I} \sum_{f \in F} w_i^f m_i^f + \theta_i^f \qquad \text{Eq. 18}$$

In other words, the CV is the sum of the $\Delta CV_i$ contributions for each feature i across the set of all features I for a given candidate item.

E. CV Contributions from Feature Relationships—Second Approach

The previously-described Document Analysis System assigns confidence values based on the degree of match for each individual feature. However, in document analysis and other applications, features may have other relationships that affect the CV value for a candidate item. Using the document analysis system for example:

a font size that is large may contribute positively to the CV (i.e. have a positive $w_{font\_size}^{large}$);

an aspect ratio of very small size may contribute positively to the CV (i.e. have a positive $w_{aspect\_ratio}^{verysmall}$); and both features taken together may contribute negatively to the CV.

This second-order feature relationship can be modeled using existing nodes, but with additional confidence parameters. Specifically, a new weight w "connects" between a node of one feature type and a node of another feature type to model the relationship between the two.

Figure 18:
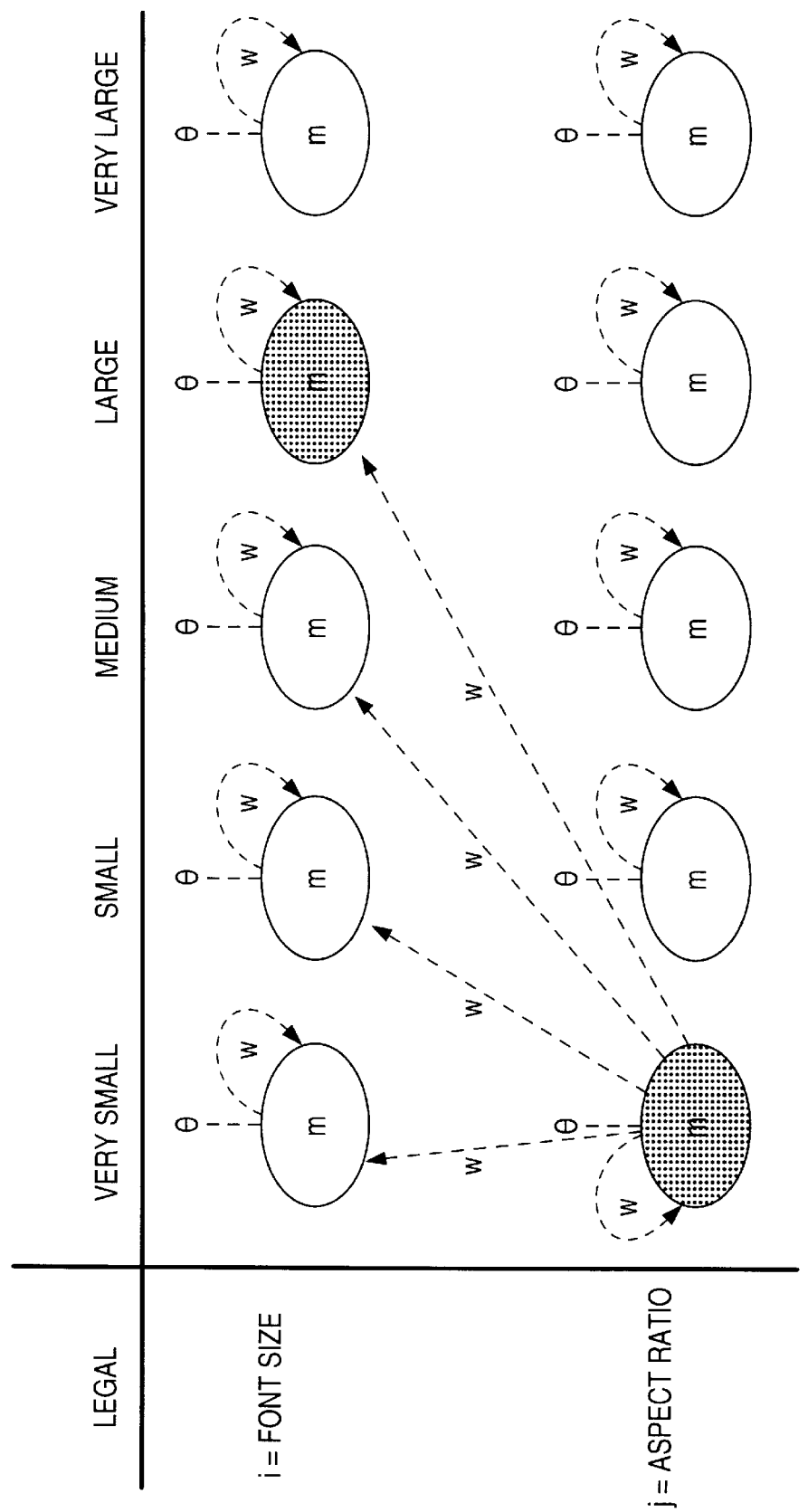

The new weights are represented by the notation $w_{ij}^{fg}$, where i is the first feature, j is the second feature, f is the fuzzy value for the first feature, and g is the fuzzy value for the second feature. A pictograph representation of this is presented in FIG. 18.

The change in CV due to the relationship between a pair of features (i,j) is described by Eq. 19 below:

$$\Delta CV_{ij} = \sum_{f \in F} \sum_{g \in F} w_{ij}^{fg} m_i^f m_j^g \qquad \text{Eq. 19}$$

It is clear from the equation that $W_{ij}^{fg}$ is the cross-correlation between the two fizzy values. The sum of cross-correlations between the fuzzy values for the two features yields the amount of CV contribution for the feature relationship. It is also possible to represent higher order relationships in the model using additional nodes.

Restricting our model to first and second order relationships only, the total CV for a candidate item for a particular model is given by the following Eq. 20:

$$CV = \sum_{i \in I} \sum_{\substack{j > i \\ j \in I}} \sum_{f \in F} \sum_{g \in F} w_{ij}^{fg} m_i^f m_j^g + w_i^f m_i^g + \theta_i^f \qquad \text{Eq. 20}$$

Equation 20 represents the sum of all relationships for each fuzzy value, for each feature and each pair of features.

F. Training the Reasoning engine—Second Approach

The CV of a candidate item, given by Eq. 20, contains two sets of parameters:

feature parameters, represented by the membership values m confidence parameters, represented by the weights w and the offsets θ

The goal of training is to determine the feature parameters and confidence parameters in the reasoning engine such that the CV generated by the mechanism is high when a candidate item's features match those of a zone model, and low when they don't. The determination of feature parameters and assignment of confidence parameters is accomplished using a training set of items that represent the same model, and a set of items that represent different models.

G. Determining Feature Parameters—Second Approach

Figure 19:
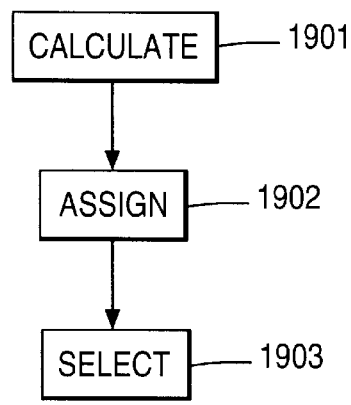

The following procedure is followed for each item, described with respect to FIG. 19. The numbers in [brackets] refer to the like-numbered reference numerals in FIG. 19:

[1901] The range of values for each feature is calculated for the zone across all the training documents.

[1902] The fuzzy values for each feature are assigned based on relative locations in the range of values.

[1903] A set of membership functions are selected.

After steps 1901–1903 are performed, the feature parameters m, which are dependent upon the fuzzy values and membership functions, have been determined.

H. Determining Confidence Parameters—Second Approach

The training of confidence parameters is less straightforward. To begin with, a model is selected for training. After assigning initial random values to its confidence parameters w and θ, the procedure alternates between examples of training items that correspond to the model, and training items that do not correspond, to adjust the confidence parameters and yield a correct CV. This procedure is designed to force the parameters of the reasoning engine to distinguish between what constitutes the zone, and what does not.

Figure 20:
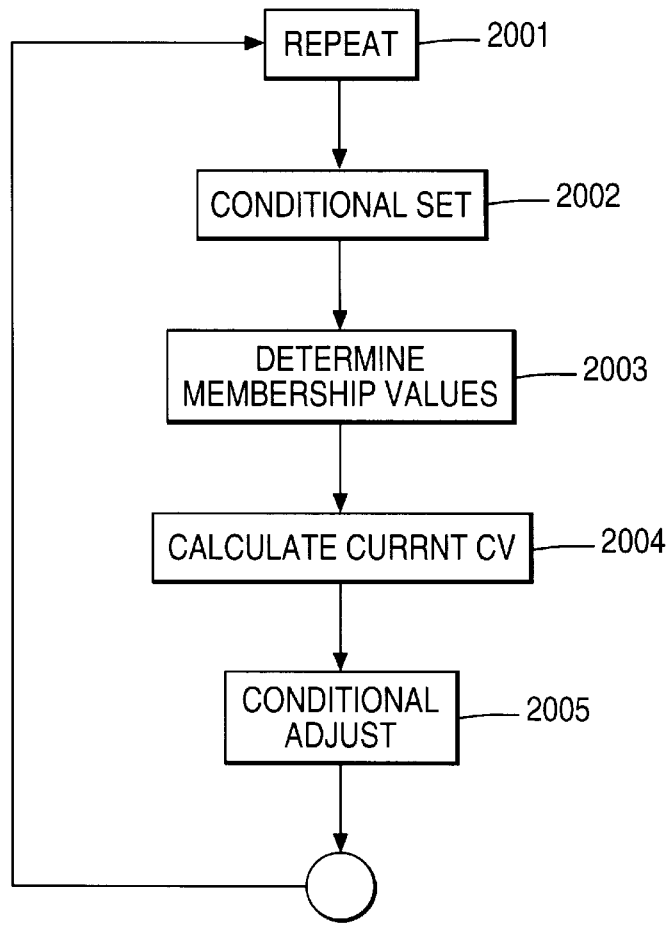
Figure 21:
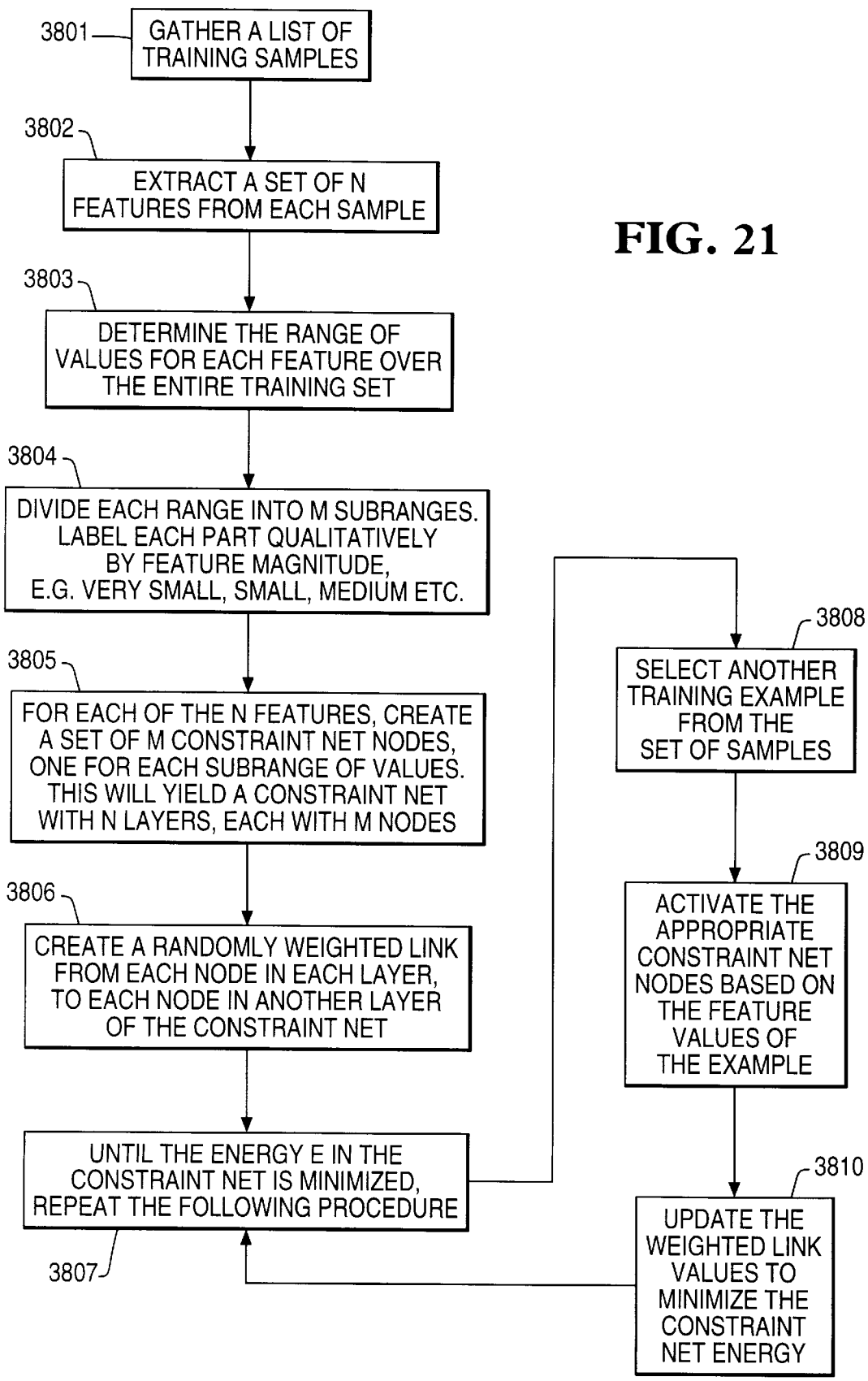
Figure 22:
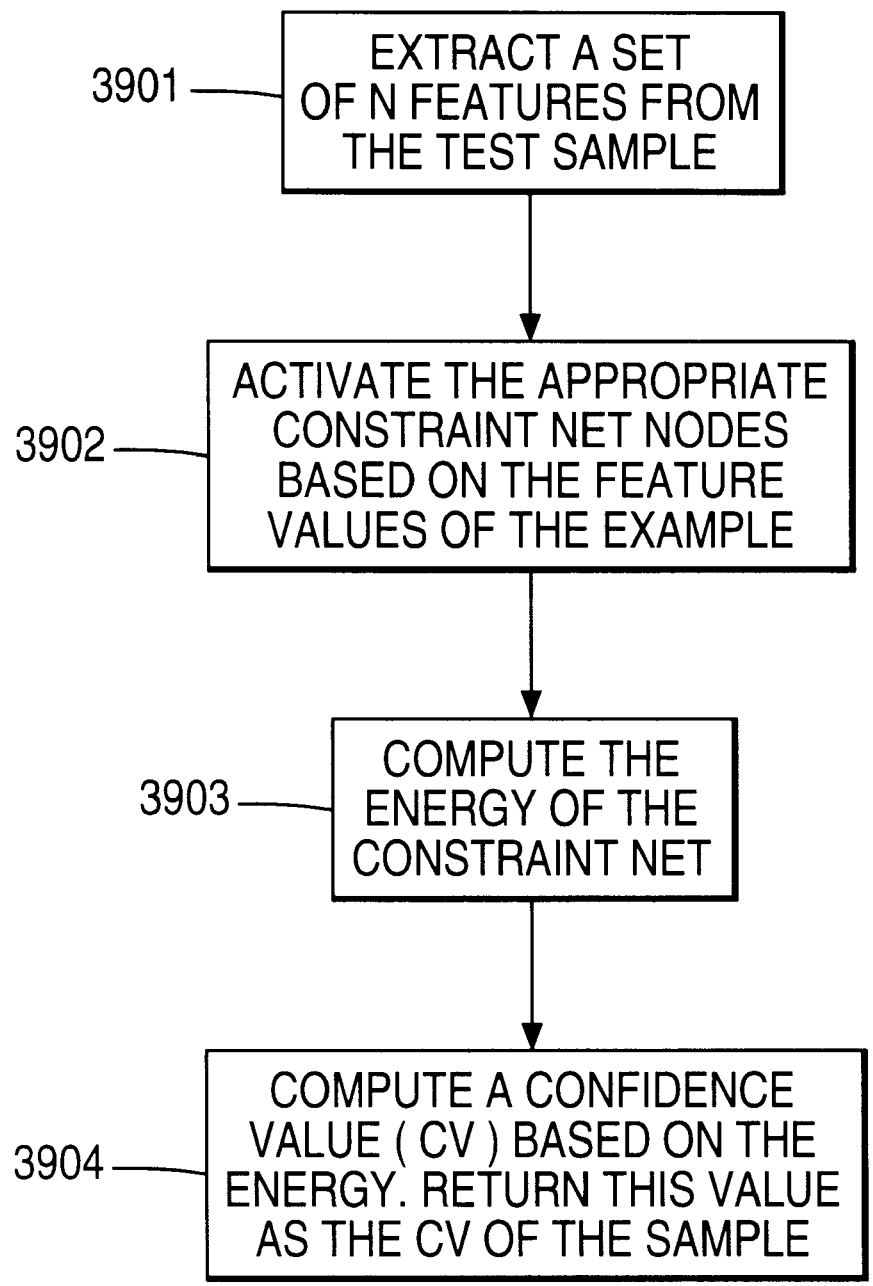

The following procedure, described with respect to FIG. 20, is used for the set of feature parameters corresponding to a given model. The numbers in [brackets] correspond to the like-numbered reference numerals in FIG. 20:

[2001] Repeat for each item in the training set:

[2002] If the item is the same type as the model, set the target CV value to 1. If the item is a different type, set the target CV value to 0.

[2003] Determine the membership values for the features of the item.

[2004] Calculate the current CV using the membership values and the current set of confidence parameters.

[2005] If the current CV and target CV differ, adjust the confidence parameters accordingly.

This procedure is repeated until the target CV values sufficiently match the current CV values.

The method for adjusting the confidence parameters is based on gradient descent. The goal is to minimize the following value of Eq. 21:

$$E = \sum_{t \in T} (CV_t - CV_t^*)^2 \qquad \text{Eq. 21}$$

In this equation, T represents the set of training examples, $CV_t^*$ is the target CV for a training example t, and $CV_t$ is the current CV value for the example. It can be shown that this function is positive-definite, which indicates a convex function with a single minimum. The gradient adjustment at each step is shown below in Eqs. 22, 23 and 24:

$$\frac{\partial E}{\partial w_i^f} = \sum_{t \in T} 2[m_i^f]_t (CV_t - CV_t^*) \qquad \text{Eq. 22}$$

-continued $$\frac{\partial E}{\partial w_{ij}^{fg}} = \sum_{t \in T} 2[m_i^f m_j^g](CV_t - CV_t^*) \quad \text{Eq. 23}$$

$$\frac{\partial E}{\partial \theta_i^f} = \sum_{t \in T} 2(CV_t - CV_t^*) \quad \text{Eq. 24}$$

In the above equations, t is an element of the training set T.

I. Current Implementation—Document Analysis

The second version of the Constraint Net 195, as detailed above, may be implemented in the improved document analysis means 125', and is used to replace the rules described previously with respect to the document analysis means 125. The candidate items (called zones) are described by the following set of 19 features:

Top Left X Location
Top Left Y Location
Bottom Right X Location
Bottom Right Y Location
Height
Width
Minimum Font Size
Maximum Font Size
Average Font Size
Number of Text Lines
Total Number of Characters
Average Number of Characters per Line
Average Interline Distance
Aspect Ratio
Type (Machine Print or Hand Print)
Vertical Line Intersection
Enclosed
Underlined
Text Justification (Left, Right, Center, All, None)

Two distinct illustrative Constraint Nets 195 were created using the training techniques described. The first Net was trained to evaluate candidate courtesy amount zones for US business checks. The second Net was trained to evaluate candidate legal amount zones for the same set of checks.

The courtesy zone Constraint Net 195 was trained on examples of 200 courtesy zones from an equal number of checks. Along with positive examples of courtesy zones (CV=1), the Net was also trained on 800 examples of non-courtesy zones (CV=0). To prevent bias, in each iteration of training a single courtesy zone example was presented four times, such that 800 positive examples and 800 negative examples were presented per iteration. The training of the net continued until $$\sum \frac{\partial E}{\partial w_{ij}^{fg}}$$

became very small (less than 0.001).

The legal zone Constraint Net 195 was trained in the same manner as the courtesy zone Net, but with 200 legal zones used for positive examples.

Both Constraint Net 195 examples described above were tested on a different set of 250 business checks. The accuracy of each Constraint Net 195 is presented below in TABLE 1, and is compared to the accuracy of the reasoning engine 125 of the previous Document Analysis System.

TABLE 1

| Constraint Net 195 vs. Previous Accuracies | Top 1 | Top 1, 2 | Top 1, 2, 3 | Top 1, 2, 3, 4 |
|---|---|---|---|---|
| Courtesy | 70.3%/53.3% | 94.1%/74.6% | 96.2%/82.7% | 98.3%/83.6% |
| Legal | 93.3%/68.4% | 99.6%/80.1% | 99.6%/84.0% | 99.6%/85.9% |

In this table, Top 1 indicates the percentage of instances that the $1^{st}$ choice was correct. Top 1,2 indicates the percentage of instances that the $1^{st}$ or $2^{nd}$ choice were correct, etc.

The Constraint Net of the present invention has been described above with respect to one application, a Document Analysis System. It will be readily understood that the Constraint Net taught in the present specification has numerous applications, only one of which is a Document Analysis System.

What is claimed is:

1. A pattern recognition system comprising:
   (a) input means for receiving feature values of an unknown object, wherein the object belongs to one of a plurality of models, and wherein each feature value has a known range; and
   (b) constraint means for providing a network of constraints representing one of the plurality of models, the constraint means comprising a plurality of weights, a plurality of nodes and a plurality of layers wherein each layer of nodes corresponds to a particular feature and each node is associated with a sub-range of the typical values for that feature for a selected one of the plurality of models, and wherein each weight corresponds to a value representing a relationship between the nodes of at least one feature type and the selected model, the constraint means performing the steps of:
   (c) receiving the features from the input means; and
   (d) responsive to the relationship between those nodes that correspond to the feature values and the weights between those nodes, generating a value corresponding to the confidence that the object belongs to the selected model.

2. The pattern recognition system of claim 1, wherein each node corresponds to the deviation of the feature value of the unknown object from the mean value for that feature.

3. The pattern recognition system of claim 2, wherein the plurality of nodes are ordered by distance from the mean value for that feature.

4. The pattern recognition system of claim 1, wherein each node corresponds to an ordered sub-range of values.

5. A pattern recognition process for generating a confidence level that an unknown object which belongs to one of a plurality of models actually belongs to a selected model, the pattern recognition process for use with a constraint network, the constraint network providing a network of constraints representing one of the plurality of models, the constraint network comprising a plurality of weights, a plurality of nodes and a plurality of layers wherein each layer of nodes corresponds to a particular feature and each node is associated with a sub-range of the typical values for that feature for a selected one of the plurality of models, and wherein each weight corresponds to a value representing a relationship between the nodes of at least one feature type and the selected model, the pattern recognition process comprising the steps of:
(a) receiving feature values of an unknown object, wherein each feature value has a known range; and
(b) responsive to the relationship between those nodes that correspond to the feature values and the weights between those nodes, generating a value corresponding to the confidence that the object belongs to the selected model.

6. The pattern recognition process of claim 5, wherein each node corresponds to the deviation of the feature value of the unknown object from the mean value for that feature.

7. The pattern recognition process of claim 6, wherein the plurality of nodes are ordered by distance from the mean value for that feature.

8. The pattern recognition process of claim 5, wherein each node corresponds to an ordered sub-range of values.

* * * * *